(12) United States Patent
Morikawa et al.

(10) Patent No.: US 8,070,472 B2
(45) Date of Patent: Dec. 6, 2011

(54) APPARATUS FOR ROLLING AND FORMING FOOD DOUGH

(75) Inventors: Michio Morikawa, Utsunomiya (JP); Norio Kobayashi, Utsunomiya (JP); Mitsuo Cho, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 382 days.

(21) Appl. No.: 12/356,698

(22) Filed: Jan. 21, 2009

(65) Prior Publication Data

US 2009/0226587 A1 Sep. 10, 2009

(30) Foreign Application Priority Data

Jan. 21, 2008 (JP) .................. 2008-010729

(51) Int. Cl.
*A21C 3/02* (2006.01)
*A21C 11/00* (2006.01)
(52) U.S. Cl. ...................... 425/366; 425/374
(58) Field of Classification Search .................. 425/356, 425/366, 374, 394
See application file for complete search history.

(56) References Cited

U.S. PATENT DOCUMENTS

| | | | | | |
|---|---|---|---|---|---|
| 1,628,828 | A | * | 5/1927 | Denmead | 425/265 |
| 4,857,349 | A | * | 8/1989 | Finlay | 425/366 |
| 5,204,125 | A | * | 4/1993 | Larsen | 425/394 |
| 7,547,206 | B2 | * | 6/2009 | Kobayashi et al. | 425/374 |
| 2009/0162512 | A1 | * | 6/2009 | Morikawa et al. | 426/502 |

FOREIGN PATENT DOCUMENTS

| | | |
|---|---|---|
| EP | 1129621 | 5/2001 |
| JP | 32-3040 | 5/1957 |
| JP | 34-489 | 2/1959 |
| JP | 58-32847 | 7/1983 |
| JP | 60-44885 | 10/1985 |
| JP | 60-45892 | 10/1985 |
| JP | 1-132660 | 5/1989 |
| JP | 1-252266 | 10/1989 |
| JP | 2-79929 | 3/1990 |
| JP | 4-45134 | 7/1992 |
| JP | 4-293477 | 10/1992 |
| JP | 09-248122 | 9/1997 |
| JP | 2000-102340 | 4/2000 |
| JP | 2005333803 | 12/2005 |
| JP | 2006-304769 | 11/2006 |
| JP | 2007-006866 | 1/2007 |
| WO | 8601078 | 2/1986 |
| WO | PCT/JP2006/310996 | 7/2006 |

\* cited by examiner

*Primary Examiner* — James Mackey
(74) *Attorney, Agent, or Firm* — Myers Andras Sherman & Zarrabian LLP; Joseph C. Andras (57) ABSTRACT

An apparatus for rolling and forming a food dough includes: a rolling roller configured to roll out a block of food dough placed on a table; and a frame unit having an inner circumferential surface configured to face the rolling roller. The rolling roller is configured to revolve around a revolving axis, and rotate around a rotation axis of the rolling roller. The rolling roller includes a first portion having a substantially conical or frustum shape extending in a rotation axial direction. The frame unit is provided outside of a revolving locus of the first portion of the rolling roller. The inner circumferential surface of the frame unit includes an upper side portion and a lower side portion that is farther from the revolving axis than the upper side portion with respect to the revolving radial direction.

11 Claims, 10 Drawing Sheets

APPARATUS FOR ROLLING AND FORMING FOOD DOUGH

TECHNICAL FIELD

The present invention relates to an apparatus and a method for rolling out a food dough for rolling out (or expanding) a block of food dough such as food dough containing fillings such as pizza dough containing cheese, pie dough and bread dough so as to form the food dough into a desired shape. More particularly, the present invention relates to an apparatus an method for forming a food dough roll for forming food dough into a desired shape without producing a protrusion of the food dough from a gap defined between a rolling roller for rolling out food dough and a frame for forming an external shape (which is a shape formed by a circumferential edge portion) of the food dough.

BACKGROUND ART

Generally, when rolling out appropriate food dough such as pie dough, pizza dough and bread dough into a flattened shape, a block of food dough having an appropriate shape is prepared so that a shape exhibited when food dough of a substantially spherical or thick disk shape is rolled out into a flattened shape becomes a generally thin disk shape or a thick disk shape (generally, referred to as a framed disk shape) in which a central portion is made thin and a circumferential edge portion is made thicker than the central portion, and the block of food dough is rolled out into a flattened shape (see, for example, JP-B-3811790 and JP-A-2007-6866).

In addition, a pizza dough and pizza producing method has been proposed in which notches (recessed portions) are formed in a circumferential edge portion of pizza dough (pizza crust), and radial grooves are formed on an upper surface and/or a lower surface of the pizza dough to thereby make it easy for the pizza dough to be cut to be separated into pieces (see, for example, JP-B-3609628 and JP-B-3635437).

BRIEF SUMMARY OF INVENTION

An above-described apparatus includes a frame which surrounds food dough, a rotational element on which a plurality of rollers are disposed radially in such a manner as to lie close to an inner circumferential surface of the frame, the rollers being mounted rotatably on the rotational element in a cantilever fashion, and a driving device for rotationally driving the rotational element in such a manner that the rollers revolve around along the inner circumferential surface of the frame. A bottom surface portion of the rotational element is formed to have a flat plane and is attached in such a manner as to freely rotate about a rotational axis of the rotational element. The rollers are each formed into a frustum shape in which a diameter thereof increases as it is directed outwards from the rotational center of the rotational element and an outermost end portion thereof is brought into abutment with the inner circumferential surface of the frame, whereby the rollers are made to roll on a plane along the bottom surface portion.

An apparatus described in JP-A-2007-6866 a vertically movable support which can rise and fall relative to a table on which food dough is placed to rest, conical rolling rollers which are supported on the vertically movable support in such a manner as to revolve around relative to the table while rotating on their axes, and a rotating motor for driving the rolling rollers to rotate on their axes.

Figure 9:
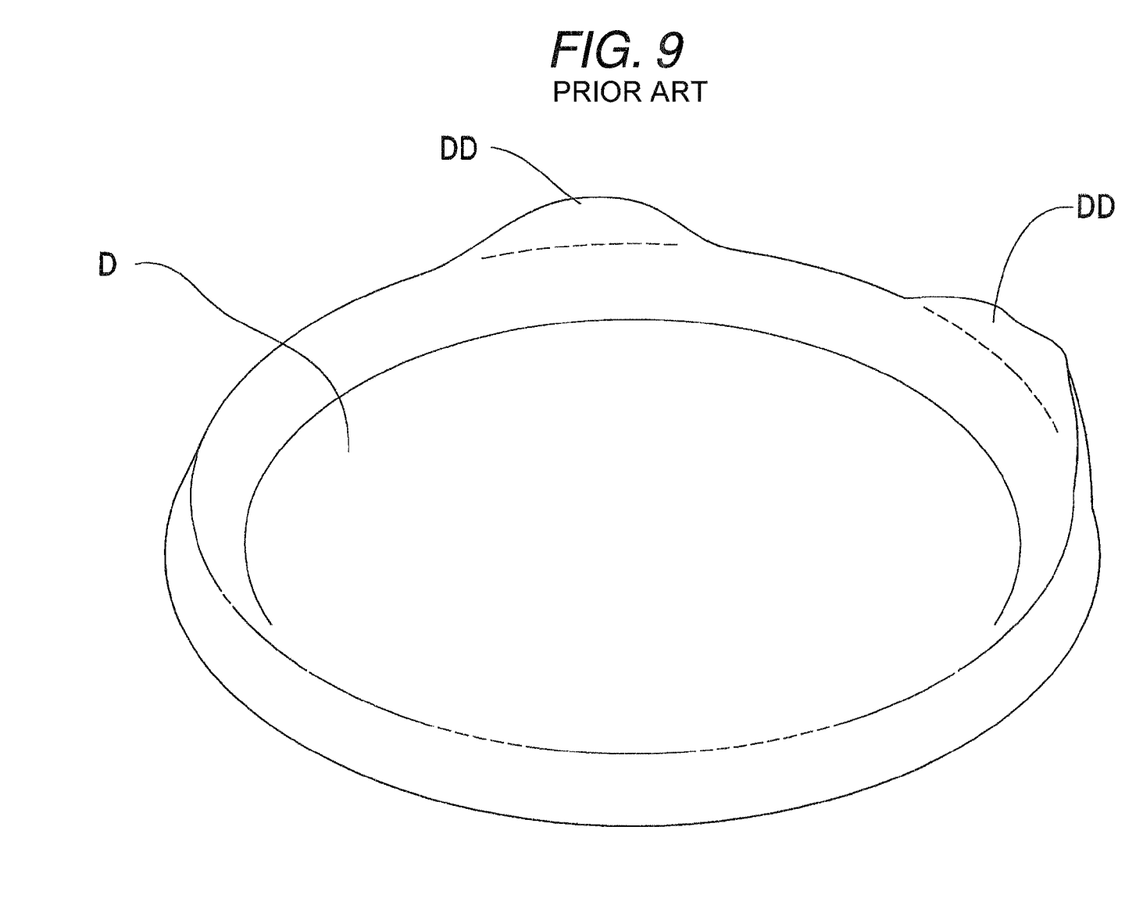
FIG. 9 is an explanatory view of food dough formed by a related-art food dough rolling and forming apparatus.

In the configuration described in JP-B-3811790, the food dough is rolled out into a shape which matches a shape defined by the inner circumferential surface of the frame. However, as is shown in FIG. 9, there has occurred from time to time a case where thin pieces of food dough DD are formed upwards of a position where the outermost end portions of the rollers are brought into abutment with the inner circumferential surface of the frame. This occurs due to a gap being produced between the outermost end portions of the rollers and the inner circumferential surface of the frame. Consequently, manual work for affixing the thin pieces of food dough DD so produced back to the main food dough D needs to be carried out in the following step, causing a problem in increasing the working efficiency.

In the configuration described in JP-A-2007-6866, since no frame is provided, the food dough is rolled out into an external shape which is attributed to a shape of a block of food dough that is supplied to the rolling apparatus.

In a pizza producing method of JP-B-3609628, a food frame for forming pizza dough (pizza crust) is described in which V-shaped elongated projections are provided radially on a bottom surface of the food frame, and a circumferential edge portion of the food frame is made to project inwards at portions where the V-shaped elongated projections reach the circumferential edge portion. Then, according to the pizza producing method, pizza dough is filled in the food frame so configured, an upper lid is placed for fermentation, and the pizza dough so fermented in the food frame is baked continuously.

In an apparatus used in a pizza dough producing method described in JP-B-3635437, a rotary cutter having a punching outer blade and a groove forming inner blade which are provided circumferentially is disposed above a conveyor belt for transporting pizza dough, and a fixed shaft of a stainless steel is installed on a lower side of the conveyor belt in such a manner as to correspond to the rotary cutter. An edge of the inner blade of the rotary cutter is formed, for example, on the order of 0.5 mm shorter than an edge of the outer blade. In addition, the outer blade is formed to extend a length which corresponds to the thickness of dough so as to implement punching. Dividing upper grooves and corresponding lower grooves are formed simultaneously and respectively on an upper surface and a lower surface of pizza dough punched out by the rotary cutter so as to divide a resulting pizza into pieces of a predetermined size, and notches corresponding to ends of the upper grooves are formed in a circumferential edge portion of the dough.

The pizza dough producing methods described in JP-B-3609628 and JP-B-3635437 are not such that rolling rollers and a frame are provided. A pizza dough forming apparatus and method have been desired in which pizza dough is formed into a desired shape by rolling out (expanding) a block of food dough into a flattened shape while positions (marks) such as notches or angled portions which indicate food dough dividing positions are formed in a circumferential edge portion of the food dough.

The present invention was made in consideration of the above circumstances.

According to a first aspect of the invention, there is provided an apparatus for rolling and forming a food dough comprising: a rolling roller configured to roll out a block of food dough placed on a table into a flattened shape; and a frame unit having an inner circumferential surface configured to face the rolling roller, wherein: the rolling roller is configured to revolve relative to the table around a revolving axis, and rotate relative to the table around a rotation axis of the rolling roller; the rolling roller is configured to move relatively towards and away from the table; the rolling roller comprises a first portion having a substantially conical or frustum shape extending in a rotation axial direction from a first base end thereof to a first distal end thereof, the first distal end being closer to the revolving axis than the first base end in a revolving radial direction with respect to the revolving axis, and the first distal end having a diameter smaller than that of the first base end; the frame unit is provided outside of a revolving locus of the first portion of the rolling roller; and the inner circumferential surface of the frame unit comprises an upper side portion and a lower side portion that is farther from the revolving axis than the upper side portion with respect to the revolving radial direction.

According to a second aspect of the invention, there is provided an apparatus for rolling and forming a food dough comprising: a rolling roller configured to roll out a block of food dough placed on a table into a flattened shape, the rolling roller comprising a first portion having a substantially conical or frustum shape extending in an axial direction from a first base end thereof to a first distal end thereof that has a diameter smaller than that of the first base end, the rolling roller being configured to relatively move towards and away from the table; a revolving driving unit configured to drive the rolling roller to revolve relative to the table around a revolving axis; a rotating driving unit configured to drive the rolling roller to rotate around the axis of the first portion; a frame unit provided outside of a revolving locus of the first portion; and a control unit configured to control at least one of the revolving driving unit and the rotating driving unit to control a rotating speed of the rolling roller, wherein the control unit is operable to: maintain a ratio of an active driving rotating speed of the rolling roller driven by the rotating driving unit to a passive driven rotating speed of the rolling roller which is a speed of the rolling roller passively rotated by a revolving motion of the rolling roller such that the active driving rotating speed is faster than the passive driven rotating speed; and increase the ratio of the active driving rotating speed to the passive driven rotating speed of the rolling roller while the rolling roller relatively moves towards the table.

According to a third aspect of the invention, there is provided a method for rolling and forming a food dough roll using an apparatus that comprises: a rolling roller configured to roll out a block of food dough placed on a table into a flattened shape, the rolling roller being configured to revolve around a revolving axis and to rotate around an axis of the rolling roller, and the rolling roller being configured to relatively move towards and away from the table; and a frame unit provided outside of a revolving locus of the first portion, said method comprising: pressing the rolling roller relative to the food dough to roll the food dough such that a shape of the food dough conforms to a shape defined by an inner circumference surface of the frame unit; driving the rolling roller to rotate at an active driving rotating speed higher than a passive driven rotating speed of the rolling roller which is a speed of the rolling roller passively rotated by a revolving motion of the rolling roller; and increasing a ratio of the active driving rotating speed of the rolling roller to the passive driven rotating speed of the rolling roller while the rolling roller relatively moves towards the table.

BRIEF DESCRIPTION OF THE DRAWINGS

FIGS. 5A and 5B show schematically a main part of a food dough rolling and forming apparatus according to a second embodiment of the invention, in which

FIGS. 6A and 6B show schematically the main part of the food dough rolling and forming apparatus according to the second embodiment of the invention, in which

DETAILED DESCRIPTION OF THE EMBODIMENTS

Figure 1:
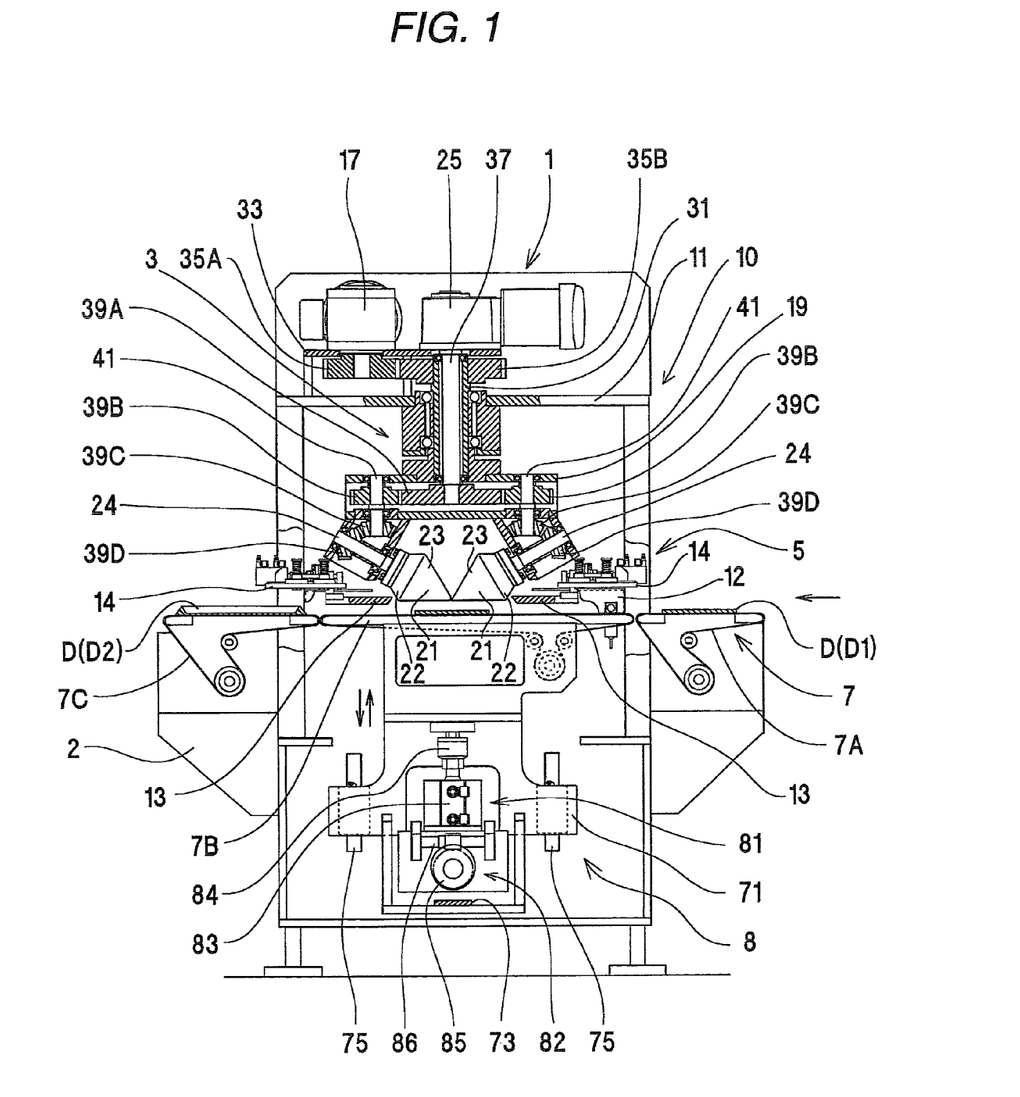
FIG. 1 is an explanatory front view which shows conceptually and schematically a main part of a food dough rolling and forming apparatus according to an embodiment of the invention.
Figure 2:
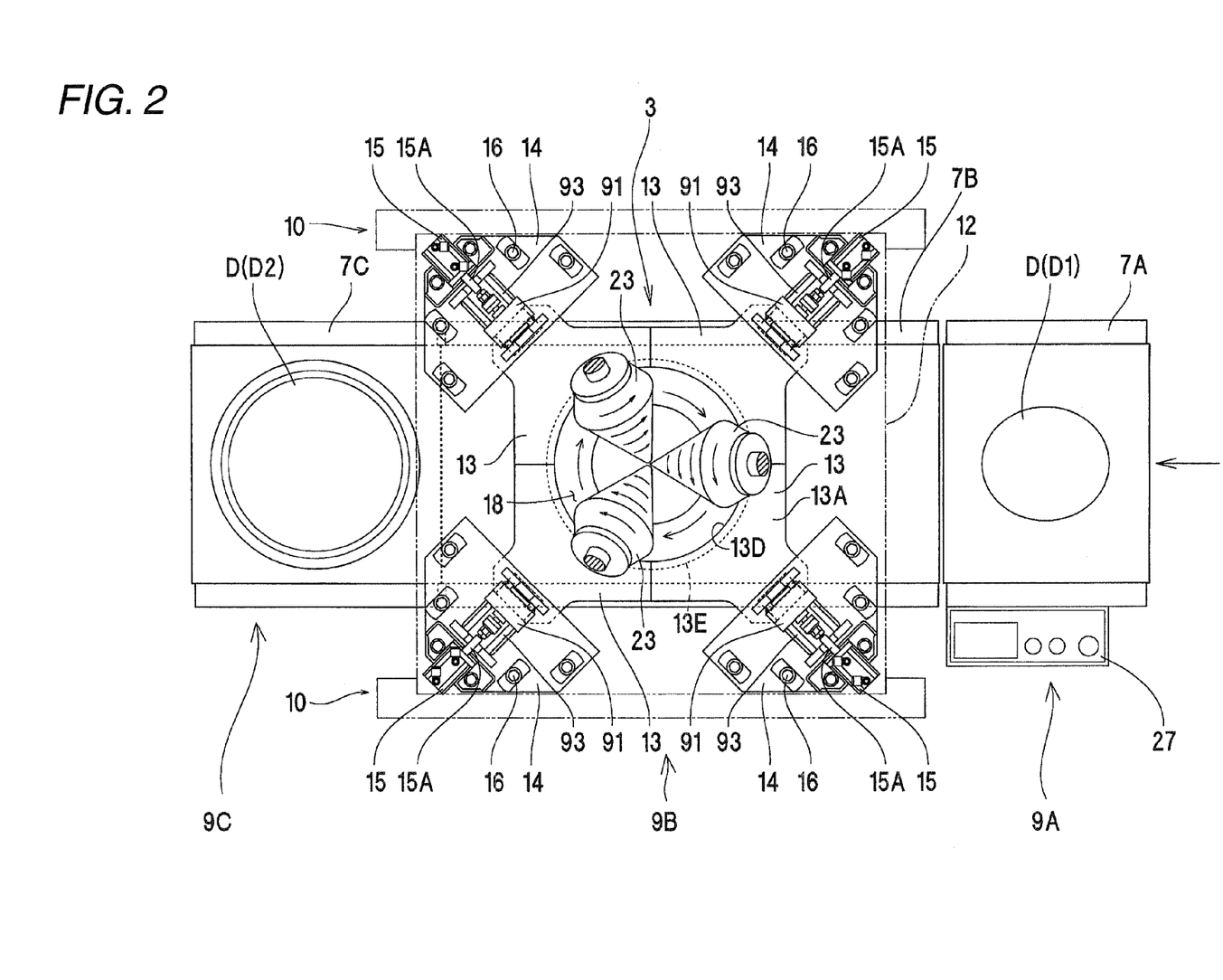
FIG. 2 is an explanatory plan view which shows conceptually and schematically the main part of the food dough rolling and forming apparatus according to the embodiment of the invention.

FIGS. 1 and 2 conceptually and schematically shows a food dough rolling and forming apparatus 1 according to an embodiment of the invention. The food dough rolling and forming apparatus 1 includes: a counter 2; a food dough rolling unit 3 configured to roll out a block of food dough D having an arbitrary shape; a frame unit 5 configured to form an external shape of the food dough D; and a belt conveyor 7 serving as a table on which the food dough D is placed to rest which also serves as an example of a food dough transporting means for transporting the food dough D. This belt conveyor 7 is configured to transport food dough sequentially from a food dough D supplying position 9A to a delivery position 9C via a rolling operating position 9B. The belt conveyor 7 is provided in such a manner as to be divided into individual belt conveyors 7A, 7B, 7C which corresponds to the food dough D supplying position 9A, the rolling operating position 9B and the delivery position 9C, respectively. Moreover, the belt conveyor 7B which corresponds to the rolling operating position 9B is made to move upwards and downwards relative to rolling rollers 23 provided on the food rolling unit 3 and a rising end position of the belt conveyor 7 is made to be adjusted by a vertical actuating unit 8. In addition, the respective belt conveyors 7A, 7B, 7C are made to be driven by driving motors (whose illustration is omitted) which are provided in such a manner as to correspond to the belt conveyors 7A, 7B, 7C, respectively.

The vertical actuating unit 8 includes a vertical actuating mechanism part 81 for raising and lowering the belt conveyor 7B and a rising end position adjusting mechanism part 82 for adjusting a rising end position of the belt conveyor 7B. The vertical actuating mechanism part 81 includes a hydraulic cylinder 83 as an example of an actuator provided on the counter 2, and a vertically movable frame 71 of the belt conveyor 7B, which is mounted and supported on a vertical guide member 75 provided on the counter 2 in such a manner as to move vertically, is connected to a reciprocating rod 84 of the hydraulic cylinder 83.

In addition, the rising end position adjusting mechanism part 82 includes a plate-shaped eccentric cam 85 which is provided rotatably thereon. The eccentric cam 85 is rotatably fixed to a rotational shaft of a worm wheel mechanism 86 which functions as an example of a power transmission mechanism which is connected to a driving motor or a manual handle, not shown, in an interlocking fashion. In addition, an abutment member 73 which is provided on a vertically movable frame 71 of the belt conveyor 7B is provided below the eccentric cam 85. Consequently, when the hydraulic cylinder 83 is actuated to lift the belt conveyor 7B upwards, the abutment member 73 rises so as to be brought into abutment with a lowermost portion of the eccentric cam 85, whereby the belt conveyor 7B is located in an adjusted rising end position.

The vertical actuating unit 8 is not limited to the illustrated example, and hence, a rack and pinion mechanism or a ball screw mechanism which is connected to a servo motor in an interlocking fashion may be connected to the belt conveyor 7B in an interlocking fashion for controlling its vertically movable position.

In the rolling operating position 9B, an upper frame part 10 is provided on the counter 2 in such a manner as to cover the belt conveyor 7B, and the food dough rolling unit 3 is provided in the upper frame part 10. In the food dough rolling unit 3, three rolling rollers 23 are provided above the belt conveyor 7B. A roller supporting frame 19 is provided at a lower end portion of a tubular rotational shaft 31 which is supported vertically and rotatably on an upper plate 11 of the frame part 10 for supporting the rolling rollers 23. In addition, a revolving motor 17 is mounted on a motor bracket 33 attached to the upper plate 11 for rotating the rotational shaft 31, and a driven gear 35B attached to an upper portion of the rotational shaft 31 is made to mesh with a driving gear 35A which is rotated by the revolving motor 17. Namely, the revolving motor 17 and the rotational shaft 31 are connected in an interlocking fashion via an appropriate power transmission mechanism such as a gear train.

A rotating motor 25 is mounted on the motor bracket 33 for rotating the rolling rollers 23 which are supported rotatably on the roller supporting frame 19, and this rotating motor 25 and the rolling rollers 23 are connected to each other via appropriate power transmission mechanisms. Namely, to describe in more detail, a rotational shaft 37 which s rotated by the rotating motor 25 is provided rotatably within the rotational shaft 31, and a gear 39A which is provided at a lower end portion of the rotational shaft 37 is made to mesh with gears 39B which are provided at one end portions of intermediate shafts 41 which are supported rotatably on the roller supporting frame 19. In addition, gears (bevel gears) 39C provided at the other end portions of the intermediate shafts 41 are made to mesh with gears 39D which are provided on shafts 24 of the rolling rollers 23. Namely, the rotating motor 25 and the rolling rollers 23 are connected to each other in an interlocking fashion via power transmission mechanisms which are each made up of a gear train in which a plurality of gears are made to mesh with each other.

The power transmission mechanism may include a timing belt in place of the gear train without having to stick to the gear train, and hence, generally known various types of configurations can be adopted.

Figure 3:
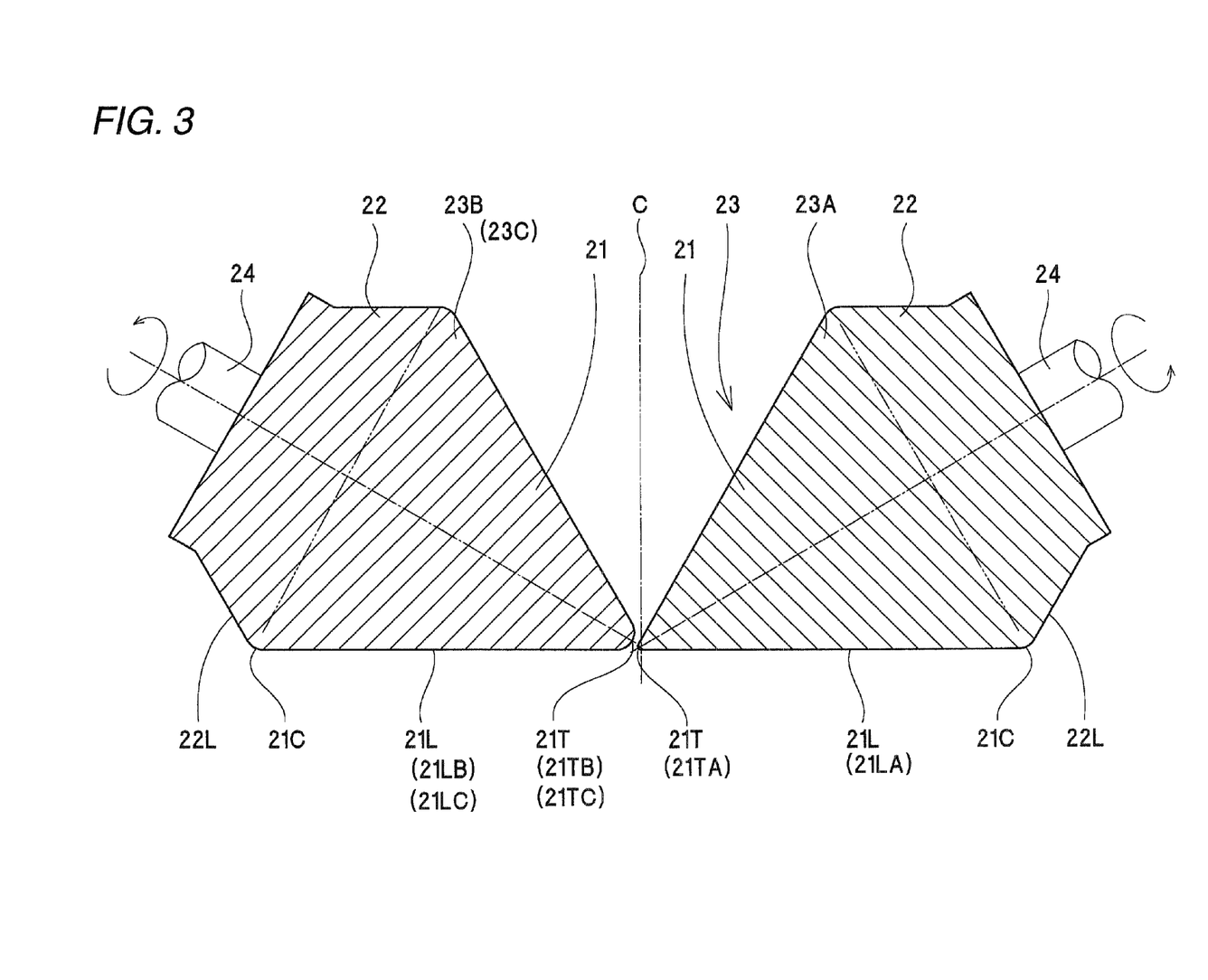
FIG. 3 is an explanatory vertically sectional front view of rolling rollers of a food dough rolling unit provided on the food dough form rolling apparatus according to the embodiment of the invention.

FIG. 3 is a vertical sectional view constituting an explanatory diagram of the rolling rollers 23 lying an imaginary plane which passes through rotational axes on which the rolling rollers 23 rotate. The rolling roller 23 includes a substantially conical front end portion 21 (which may be referred to as a conical portion from time to time) and a substantially frustum-shaped rear end portion 22 (which may be referred to as a frustum portion from time to time), and the shaft 24 is provided on a rear end portion 22 side of the rolling roller 23. The plurality of rolling rollers 23 are provided at equal intervals along a circumferential direction in which the roller rollers 23 revolve around (refer to FIG. 2), and an apex portion 21T of the front end portion 21 of each rolling roller 23 is disposed in the vicinity of a position which substantially coincides with an extension (referred to as a revolving axis C) of an axial center of an output shaft of the revolving motor 17 (refer to FIG. 1). In addition, generatrices 21L of lowest portions of the conical front end portions 21 of the respective rolling rollers 23 are horizontal and disposed in such a manner as to be brought into contact with the same plane. Furthermore, generatrices 22L of lowest portions of the frustum-shaped rear end portions 22 of the respective rolling rollers 23 are each formed in such a manner as to form an obtuse angle relative to the generatrix 21L. Namely, in the generatrix 22L of the lowermost portion of the frustum-shaped portion 22, an upper end is inclined further outwards relative to the revolving axis C than a lower end. In addition, in this embodiment, the generatrix 21L and the generatrix 22L are formed in such a manner as to extend continuously via an arc (a curved surface when considering the configuration of the rolling roller 23), and a boundary portion lying between the front end portion 21 and the rear end portion 22 and constituting a largest diameter portion of the front end portion 21 is referred to as a largest diameter portion 21C.

To describe in greater detail, in the rolling rollers 23A, 23B, 23C, the respective apex portions 21T are formed into spherical surfaces, and in one example, the apex portion 21TA is made into a spherical surface having a radius of 1 mm, while the apex portions 21TB, 21TC of the rolling rollers 23B, 23C are each formed into a spherical surface having a radius of 5 mm. In addition, in the vertical sectional view in FIG. 3, in the rolling roller 23A, an intersection point of the generatrix 21LA and the arc forming the apex portion 21TA, that is, an apex portion 21TA side end portion of the generatrix 21LA is disposed in a position which substantially coincides with the revolving axis C or a position which has passed through the revolving axis C (which lies on a left side of the revolving axis C in FIG. 3). Consequently, a revolving locus of a distal end side of the rolling roller 23A can roll out a portion of food dough situated at the revolving axis C, thereby making it possible to roll out the food dough to be flat as deep as the center thereof. In addition, also in case where the plurality of rolling rollers are not provided but only one rolling roller is provided, the food dough can be rolled out properly. The generatrix 21L of the distal end portion 21 is disposed horizontal, but may be inclined relative to the belt conveyer 7B. For example, the generatrix 21L may inclined downwards from the apex portion 21T towards the largest diameter portion 21C.

The frame unit 5 is provided below the food dough rolling unit 3 and includes four frame members 13 for forming an external shape of food dough which are provided outside the revolving locus along which the rolling rollers 23 revolve around and at equal intervals in a circumferential direction in which the rolling rollers 23 revolve around the revolving axis C as a center of their revolution. In addition, the frame members 13 are provided movable vertically relative to the rolling rollers 23. To describe this in greater detail, an intermediate plate 12 is provided horizontal above the belt conveyor 7B in the frame part 10, and the frame unit 5 including the respective frame members 13 is provided on an upper surface of the intermediate plate 12 in such a manner as to move vertically relative to the intermediate plate 12.

Vertically movable plates 14, which are made to correspond respectively to the frame members 13, are provided slidably on four sliding shafts 16 which are provided on the intermediate plate 12 in such a manner as to be erected upwards therefrom, and a biasing force is exerted on an upper side of each vertically movable plate 14 at all times by virtue of a restoration force of a compression spring S fitted on the sliding shaft 16. A hydraulic cylinder 15, which utilizes pneumatic pressure or the like, is provided on an upper surface of each vertically movable plate 14 as an example of an actuator, and four hydraulic cylinders 15 are provided radially at equal intervals around the revolving axis C. A guide member 93 is provided inside (a reciprocating rod 15A side) of each hydraulic cylinder 15, and the guide member 93 includes a reciprocating table 91 which is provided in such a manner as to freely reciprocate. Then, the reciprocating rod 15A of the hydraulic cylinder 15 is connected to the reciprocating table 91, and further, the frame member 13 is provided on the reciprocating table 91. Thus, the frame members 13 are provided in such a manner as to move towards and away from each other in conjunction with the reciprocating motions of the reciprocating rods 15A.

Figure 4A:
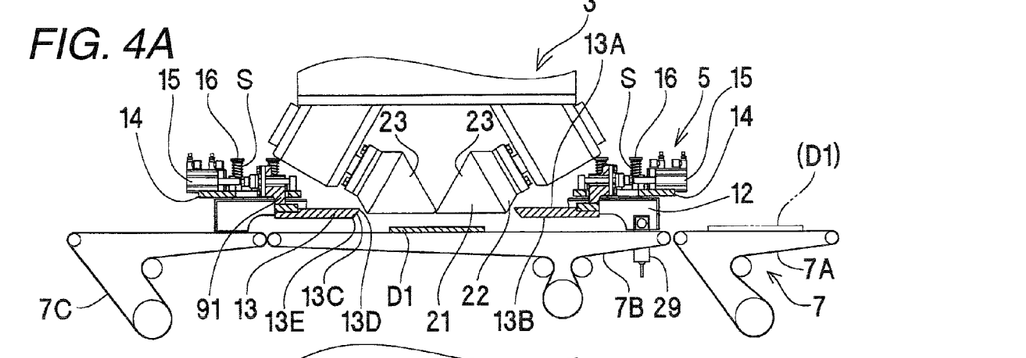
FIGS. 4A to 4D are explanatory drawings explaining a forming process of food dough.
Figure 4B:
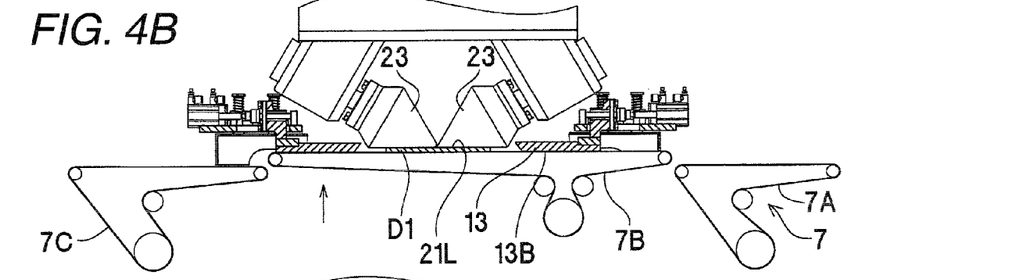

Consequently, when the belt conveyor 7B rises to approach the rolling rollers 23 relatively, in the midst of the rising step of the belt conveyor 7B, a carrying surface (a food dough D resting surface) of the belt conveyor 7B is brought into abutment with lower surfaces of the frame members 13 (refer to FIG. 4B), and by the belt conveyor 7B rising further, the frame unit 5 is raised relative to the rolling rollers 23. As this occurs, the frame members 13 are brought into press contact with the carrying surface of the belt conveyor 7B by virtue of the restoration force of the compression spring S which is the compressed further. The invention is not limited to the compression spring S as the device for bring the frame members 13 into press contact with the food dough resting table. For example, various types of pressurizing devices can be used which include increasing the weight of the vertically movable frame unit 5.

In addition, inner circumferential surfaces 13C of the frame members 13 form a frustum-shaped frame hole 18 when the inner circumferential surfaces 13C move towards each other. Namely, a radius of an arc at an upper end portion 13D of the inner circumferential surface 13C is made smaller than a radius of an arc at a lower end portion 13E of the inner circumferential surface 13C. In other words, the inner circumferential surface 13C constitutes an inclined surface which is inclined inwards towards a center of the frame hole 18 as it extends from the upper end portion 13D to the lower end portion 13E. To describe this in a further different way, the inner circumferential surface 13C constitutes a forming surface in which the lower end portion 13E is expanded further outwards than the upper end portion 13D.

Figure 4C:
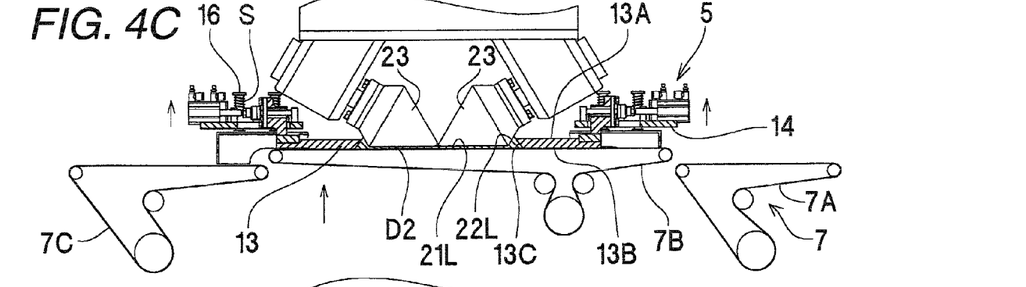
Figure 4D:
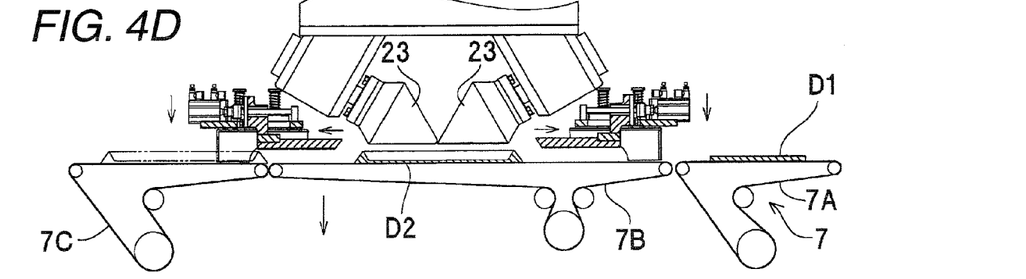

In the frame member 13, when the belt conveyor 7B has risen to its rising end position, an upper surface 13A of the frame member 13 is positioned upper than the generatrix 21L of the lowest portion of the rolling roller 23, and a lower surface 13B of the frame member 13 is disposed in such a manner as to be positioned lower than the generatrix 21L. In addition, the generatrix 22L at the lowest portion of the frustum portion 22 is disposed further inwards than the inner circumferential surface 13C of the frame member 13 without being in contact therewith and forms a substantially inverted fan shape together with the inner circumferential surface 13C (the inclined line) as viewed in the vertical sectional view of the frame member (refer to FIG. 4C).

The food dough rolling and forming apparatus 1 includes a control unit 27 for controlling the food dough rolling and forming apparatus 1 and a food dough detection unit 29 for detecting food dough D which is transported from the supplying position 9A to the rolling operating position 9B (refer to FIG. 1). This food dough detection unit 29 is illustrated as an optical sensor for optically detecting food dough D which is transported from the supplying position 9A to the rolling operating position 9B.

In the configuration that has been described heretofore, a process for forming thick disk-shaped food dough D1 into framed food dough D2 will be described by reference to FIGS. 4A to 4D. Thick disk-shaped food dough D1 which has been transported to the supplying position 9A under the control of the control unit 27 is transferred from the belt conveyor 7A to the belt conveyor 7B and is then detected by the food dough detection unit 29. The driving of the belt conveyor 7B which is now transporting the food dough D1 is temporarily stopped based on a detection signal from the food dough detection unit 29 and the food dough D1 is then transported to the rolling operating position 9B (refer to FIG. 4A). Then, the revolving motor 17 is driven, whereby the rolling rollers 23 start to revolve around, while the rotating motor 25 is driven to drive the rolling rollers 23 to rotate on their axes, and the belt conveyor 7B rises so as to a space between the rolling rollers 23 and the carrying surface (the food dough resting surface) of the belt conveyor 7B is decreased gradually to a desired space.

Firstly, the lowest portions of the rolling rollers 23 are brought into contact with an upper surface of the food dough D1. Then, by the rolling rollers 23 pressing the food dough D1, the food dough D1 is rolled into a flattened shape while an external shape of the food dough D1 is being changed largely. Next, the belt conveyor 7B is brought into abutment with the lower surfaces 13B of the frame members 13 which have come to lie close to one another (refer to FIG. 4B). Further, the belt conveyor 7B is raised to the rising end position, whereby by the rolling rollers 23 pressing further the food dough D1, the food dough D1 is rolled into a further flattened shape while the external shape thereof is being changed more largely, and the food dough D1 continues to be rolled out until the food dough which is pushed outwards from the distal end portions 21 of the rolling rollers 23 reaches the frame hole 18 formed by the inner circumferential surfaces 13C of the frame members 13 (refer to FIG. 4C). Then, the belt conveyor 7B starts to fall, and the respective hydraulic cylinders 15 are actuated to move the corresponding frame members 13 away from one another in a radial direction, whereby the resulting food dough D2 is separated from the frame members 13 (refer to FIG. 4D). The belt conveyor 7B falls to its initial position to transfer the food dough D2 to the delivery position 9C on the belt conveyor 7C, whereupon the food dough D2 is transported to the next step in this delivery position 9C.

Since the inner circumferential surface 13C of the frame member 13 is made into the inclined surface which is inclined inwards towards the center of the frame hole 18 as it extends from the lower end portion 13E towards the upper end portion 13D and hence functions to direct downwards a circumferential edge portion of the food dough D1 which is pushed outwards from the largest diameter portion 21C of the rolling roller 23 so as to suppress the riding of the food dough D1 on to the upper surface 13A of the frame member 13. In addition, since the frame member 13 is brought into press contact with the upper surface of the belt conveyor 7B which functions as the dough resting table by virtue of the downward biasing force exerted by the compression spring S, the intrusion of the outwardly expanding food dough D1 between the lower surface 13B of the frame member 13 and the upper surface of the belt conveyor 7B is suppressed. Consequently, there occurs no such situation that a piece of thin food dough is formed on the circumferential edge portion of the food dough D2, whereby the circumferential edge portion of the food dough D2 is formed into a shape which matches or is defined by the inner circumferential surfaces 13C of the frame members 13. Therefore, no manual work to correct the external shape of the food dough has to be carried out in the next step or no such step becomes necessary, thereby making it possible to realize an increase in working efficiency.

In addition, the configuration of the inner circumferential surface 13C of the frame member 13 along the vertical sectional plane is not limited to the rectilinear inclined surface. Therefore, for example, a concaved curve shown in FIG. 5B or a substantially L-shape in which an upper portion is formed by a curve and a lower portion is formed by a vertical line may be adopted. Namely, the inner circumferential surface 13C may be formed in such a manner that an upper side is made to lie closer to the center (which coincides with the revolving axis C) than a lower side. In other words, the inner circumferential surface 13C may be formed into a forming surface which is expanded further outwards at a lower side than at an upper side. The inner circumferential surface 13C that is formed in this manner functions to suppress the riding of the food dough D which is rolled out to be expanded outwards on to the upper surface 13A of the frame member 13.

In addition, although the rolling roller 23 may rotate on its axis at the same speed as a rotating speed which results when the rolling roller 23 is passively driven to rotate on its axis as a result of the rolling roller 23 is driven to revolve around by the revolving motor 17, the rolling roller 23 is preferably driven at an active driving rotating speed by the rotating motor 25 to rotate on its axis at a faster speed than the aforesaid rotating speed. Namely, the rotating speed of the rolling roller 23 is to be a rotating speed which is faster than the rotating speed which is attributed to the passively driven rotation (hereinafter, referred to as a passive driven rotating speed). More specifically, the rolling roller 23 is driven to rotate on its axis at active driving rotating speeds which are faster on the order of about 1.4 to 2.8 times than the passive driven rotating speed.

Consequently, since the rolling roller 23 is such as to be driven to rotate on its axis at higher speeds than the passive driven rotating speed, in the event that for example, a ridge-like slight protuberance exists forwards in the traveling direction of the rolling roller 23 on the food dough D, a function is produced to draw the protuberant portion into a lower side 23 of the rolling roller, so that the protuberance can effectively eliminated.

Further, since the peripheral speed of the conical rolling roller 23 is faster at the largest diameter portion 21C than at the apex portion 21T of the rolling roller 23, the food dough D tends to be pulled from the apex portion 21T side to the largest diameter 21C side of the rolling roller 23 (in the radial direction), whereby the food dough D can be rolled out effectively into an appropriate shape such as a flattened shape in which a central portion is flat as a result of the synergy between the pressing action by the rolling roller 23 and the high-speed rotating action of the rolling roller 23 which is actively driven to so rotate on its axis.

In addition, the food dough D1 which has expanded further outwards than the largest diameter portion 21C of the rolling roller 23 comes into contact with the substantially frustum-shaped rear end portion 22 and tends to be drawn towards the largest diameter portion 21C of the rear end portion 22 whose peripheral speed is faster (towards the center). Namely, the frustum portion 22 functions, coupled with the action of the inner circumferential surface 13C, to guide the circumferential edge portion of the food dough D1 downwards, so as to suppress the riding of the food dough D1 on to the upper surface 13A of the frame member 13. Consequently, the food dough D2 results in which the central portion is rolled out thin uniformly, while the circumferential edge portion is formed on a radially outer side of the central portion in such a manner as to be thicker uniformly than the central portion.

Incidentally, the active driving rotating speed of the rolling roller 23 can be made slower than the speed about 1.4 times faster than the passive driven rotating speed. As this occurs, however, the food dough D1 is pushed and expanded over the distal end portion 21 of the rolling roller 23 to come into contact with the inner circumferential surface 13C of the frame member 13, whereupon the circumferential edge portion of the food dough D1 is held on the inner circumferential surface 13C, and a ridge-like slight protuberance of food dough existing forwards in the traveling direction of the rolling roller 23 is pressed to be shifted in the traveling direction by the rolling roller 23 revolving around, leading to a case where a wrinkle such as a twisting patter of food dough is formed on an upper surface (a rolled out surface) of the resulting food dough D2. Consequently, in order to enhance the function to draw the food dough D1 underneath the lower side of the rolling roller 23 and to suppress the formation of the wrinkle, the active driving rotating speed of the rolling roller 23 is desirably made equal to or faster than the speed about 1.4 times faster than the passive driven rotating speed.

In addition, in the event that the active driving rotating speed of the rolling roller 23 is made faster than a speed about 2.8 times faster than the passive driven rotating speed, the function of the rolling roller 23 to draw a portion of the food dough D1 lying forwards in the traveling direction of the rolling roller 23 towards underneath the lower side of the rolling roller 23 is increased further, and the circumferential edge of the food dough D1 is held on the inner circumferential surface 13C of the frame member, leading to a case where a wrinkle having a twisted patter opposite to the twisted pattern produced in the way described above is formed on the upper surface of the resulting food dough D2, which is not desirable.

As has already been understood by those reading this specification, at least in a final stage of the so-called roll forming process of food dough D where the circumferential edge of the food dough D1 comes into contact with the inner circumferential surface 13C of the frame member 13, the active driving rotating speed of the rolling roller 23 is desirably set to the range of the order of about 1.4 to about 2.8 times faster the passive driven rotating speed. It is desirable that the active driving rotating speed of the rolling roller 23 is selected as required depending on the physical properties of food dough D or the volume of flour applied to food dough D before the roll forming process starts. In addition, it is possible to use as the food dough D appropriate food dough from, for example, a selection of food dough resulting just after the dough has been formed into a round shape, food dough resulting after a dough restoration time of several tens of minutes has elapsed, food dough resulting after a fermentation step has been completed and the like, in addition to the thick food dough which has once been rolled out appropriately to an appropriate thickness.

Incidentally, in the description that has been made heretofore, the food dough D is described as being raised relative to the rolling rollers 23 which are disposed in the position at a predetermined height to be rolled out thereby. However, it is also possible that the rolling rollers 23 are caused to fall relative to the food dough D disposed in a position at a predetermined height so that the food dough D can be rolled out. Namely, it is relative whether the food dough D is raised relative to the rolling rollers 23 or the rolling rollers 23 are caused to fall relative to the food dough D. Consequently, part of the upper frame part 10 which supports the rolling rollers 23 can be made to rise and fall.

Figure 5A:
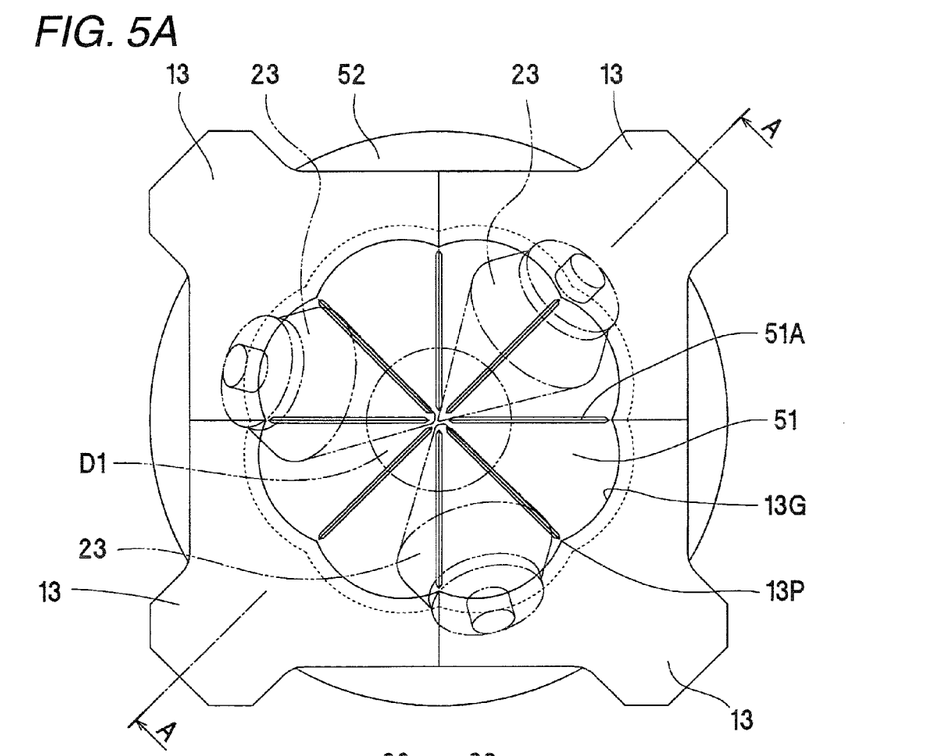
FIG. 5A is a plan view thereof and FIG. 5B is an explanatory partially vertically sectional front view thereof.
Figure 5B:
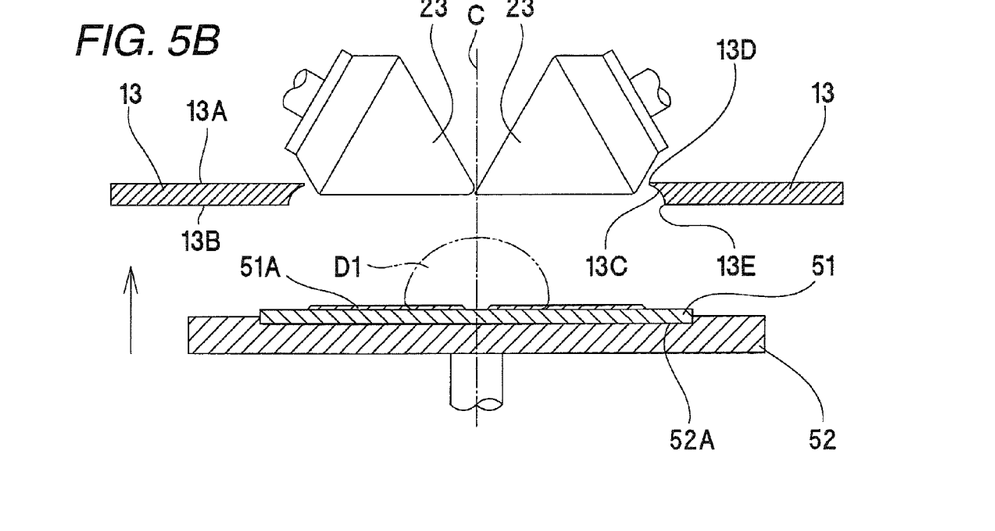
Figure 6A:
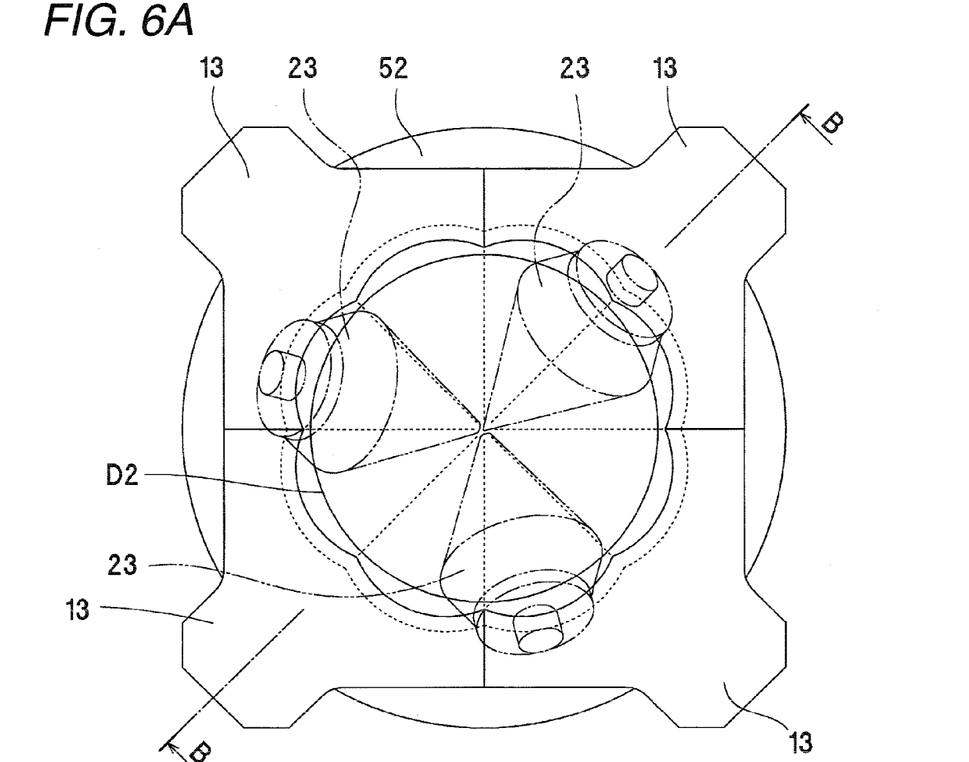
FIG. 6A is a plan view thereof and FIG. 6B is an explanatory partially vertically sectional front view thereof.
Figure 6B:
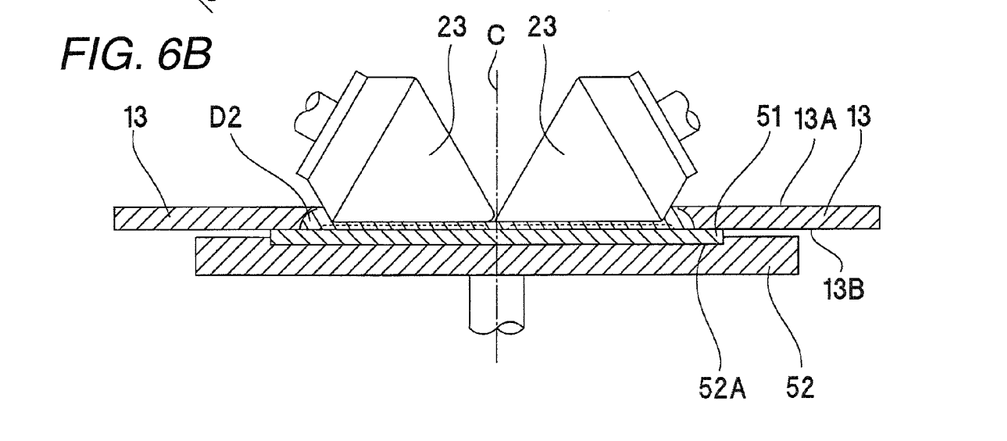

FIGS. 5A and 5B and FIGS. 6A and 6B show conceptually and schematically a food dough rolling and forming apparatus 1 according to a second embodiment, and in this embodiment, a case will be described in which a substantially spherical block of food dough D1 is rolled out into food dough D2 which can be divided into a plurality of pieces of food dough. FIG. 5A is an explanatory plan view, and FIG. 5B is an explanatory sectional front view taken along the line A-A in FIG. 5A and viewed in a direction indicated by arrows attached thereto. In addition, FIG. 6A is an explanatory plan view, and FIG. 5B is an explanatory sectional front view taken along the line B-B in FIG. 6A and viewed in a direction indicated by arrows attached thereto. In addition, like reference numerals are given to like constituent elements to those described in the first embodiment in terms of function, so as to omit the repetition of the same description.

In the second embodiment, a frame hole 18 which is formed when frame members 13 come close to one another is illustrated, as viewed from the top in FIG. 5A, as a shape like a corolla in which eight concave arcs 13G (or curves) are connected to one another radially at equal intervals. Namely, an upper end portion 13D and a lower end portion 13E of the frame member 13G are formed by arcs having radii which are smaller than a distance to an outermost which lies farthest from a center (which coincides with a revolving axis) of the frame hole 18. In addition, an inner circumferential surface 13C of the frame member 13 is illustrated as a concave curve which is formed in such a manner that the position of the upper end portion 13D comes closer to the center (which coincides with the revolving axis C) than the position of the lower end portion 13E as viewed in the vertical sectional view in FIG. 5B.

In the second embodiment, as a table on which food dough D is placed to rest, a disk-shaped tray 51 is detachably fitted in a recessed portion 52A formed on a vertically movable support 52. The vertically movable support 52 is disposed below rolling rollers 23 and is connected to a vertical actuating unit, not shown, in an interlocking fashion, whereby the vertically movable support 52 is provided in such a manner as to move vertically. In the second embodiment, the vertically movable support 52 corresponds to the rolling operating position 9B.

Eight rectilinear elongated projecting portions 51A are provided individually on the same radial lines as those on which eight projecting portions 13P which are formed along the frame hole 18 by the frame members 13 when they come close to one another lie so that the elongated projecting portions 51A correspond to the projecting portions 13P, respectively.

In addition, although the rolling roller 23 may rotate at an active driving rotating speed which is the same as its passive driven rotating speed, the rolling roller 23 is preferably driven to rotate at faster speeds than the passive driven rotating speed. Furthermore, when a substantially spherical block of food dough D is rolled out, in an initial stage of a rolling out process, that is, in a stage resulting before a circumferential edge of food dough D which is being rolled out into a flattened shape while its external shape is being changed largely comes into contact with the inner circumferential surface 13C of the frame member 13, the rolling roller 23 is desirably driven to rotate on its axis at speeds on the order of abut 1.05 to 1.4 times faster than the passive driven rotating speed. In addition, in a final stage of the rolling out process, that is, in a stage resulting before or after the circumferential edge of the food dough D comes into contact with the inner circumferential surface 13C of the frame member 13, the rolling roller 23 is desirably driven to rotate on its axis at speeds on the order of about 1.4 to 2.8 times faster than the passive driven rotating axis.

Namely, the rotation of a rotating motor is made to be controlled by a control unit 27 in such a manner as to increase a ratio of the active driving rotating speed to the passive driven rotating speed of the rolling roller 23 in the midst of a step in which the tray 51, which functions as the dough resting table, and the rolling rollers 23 are made to move relatively towards each other.

Here, a roll forming process of food dough D according to the second embodiment will be described. A substantially spherical block of food dough D1 (refer to FIG. 6A, in which indicated by a solid line) is placed substantially in a center of an upper surface of the tray 51, and the rolling rollers 23 are made to revolve around at a revolving speed of 100 rpm and rotate on their axes at an active driving rotating speed which is on the order of about 1.3 times faster than the passive driven rotating speed, while the vertically movable support 52 is raised gradually. Then, the food dough D comes into contact with the rolling rollers 23 from its apex portion (a thickest position at a central portion), and by the rolling rollers 23 pressing against the food dough D1, the food dough D1 is rolled out into a flattened shape while its external shape is being changed largely. Then, in the midst of the continuing relative approach between the rolling rollers 23 and the tray as the dough resting table, the speeds of the rolling rollers 23 are changed in such a manner, for example, that the revolving speed is decreased to 60 rpm, while the active driving rotating speed is increased to a speed on the order of about 2.2 times faster than the passive driven rotating speed.

Then, before or after the revolving and rotating speeds of the rolling rollers 23 are changed, the tray 51 is brought into abutment with lower surfaces 13B of the frame members 13 which have come close to one another. Further, the tray 51 is caused to rise to its rising end position, and the rolling rollers 23 are then made to press against the food dough D, whereby the food dough D1 is rolled out into a further flattened shape while the external shape of the dough D1 is being changed more largely, the food dough D1 continuing to be rolled out until the food dough which is pushed outwards from the distal end portions 21 of the rolling rollers 23 reaches the frame hole 18 defined by the inner circumferential surfaces 13C of the frame members (refer to FIG. 6B). Then, as a result, food dough D2 is formed which has a so-called framed shape in which a central portion is thick and a circumferential edge portion is made thicker than the central portion and which includes along a circumferential edge portion notches (recessed portions) which are formed by the projecting portions 13P and further radial grooves which are formed by the elongated projecting portions 51A on a lower surface thereof.

The food dough which is pushed outwards from the distal end portion 21 of the rolling roller 23 is, as with the first embodiment, is directed downwards due to the inner circumferential surface 13C of the frame member 13 being formed in the concaved curved surface in such a manner that the position of the lower end portion 13E (the lower side portion) is expanded further outwards than the position of the upper end portion 13D (the upper side portion), and therefore, the riding of the food dough so pushed outwards on to the upper surface 13A of the frame member 13 is suppressed. In addition, the food dough is also directed downwards by virtue of a drawing action of a rear end portion of the rolling roller 23, whereby the riding of the food dough so pushed outwards on to the upper surface 13A of the frame member 13 is suppressed.

In addition, as a means for forming marks for dividing the food dough D2 into a plurality of pieces of food dough on the circumferential edge portion of the food dough D2, the frame hole 18 is may be into a frustum shape as viewed from the top, so that, for example, semi-circular projecting portions are formed on a circumference thereof. In addition, the frame hole 18 may be formed into a polygonal shape, so that respective angular corners are made to constitute positions indicating dividing positions of the food dough D2.

In addition, the elongated projecting portions 51A provided on the upper surface of the tray 51 may be such that a plurality of projecting objects are disposed in a straight line, in addition to the elongated projecting portions 51A being formed into the rectilinear configuration. Even with the elongated projecting portions so configured, broken grooves can be formed on the food dough D2, whereby the food dough D2 can be divided into a plurality of pieces of food dough along the broken grooves so formed.

Note that the elongated projecting portions do not necessarily have to be provided, and instead, marks indicating dividing positions may only have to be formed along the circumferential edge portion of the food dough, so that the food dough can be divided at the marks with a knife.

Figure 7:
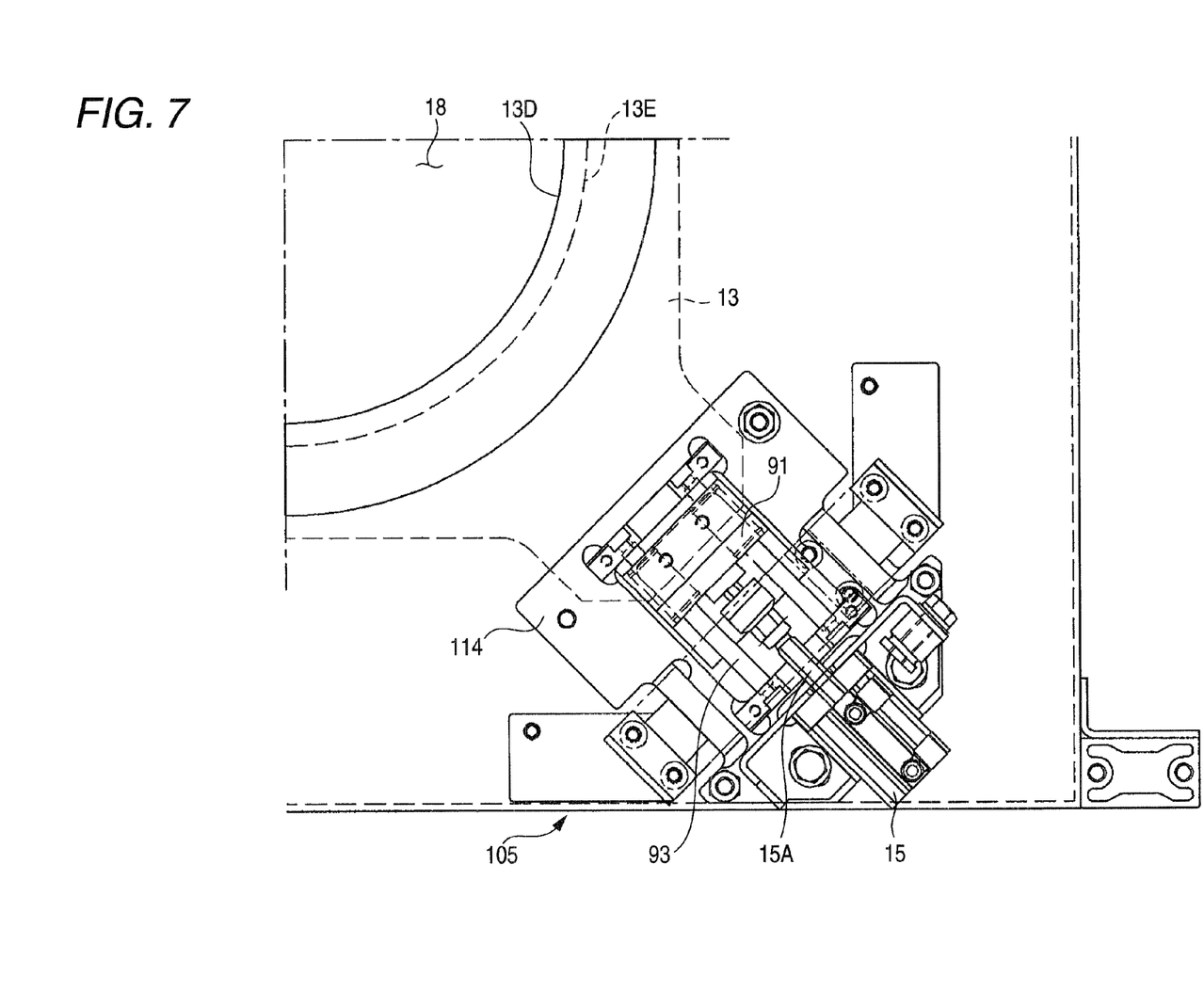
FIG. 7 is an explanatory plan view which shows conceptually and schematically the main part of the food dough rolling and forming apparatus according to a third embodiment of the invention.
Figure 8A:
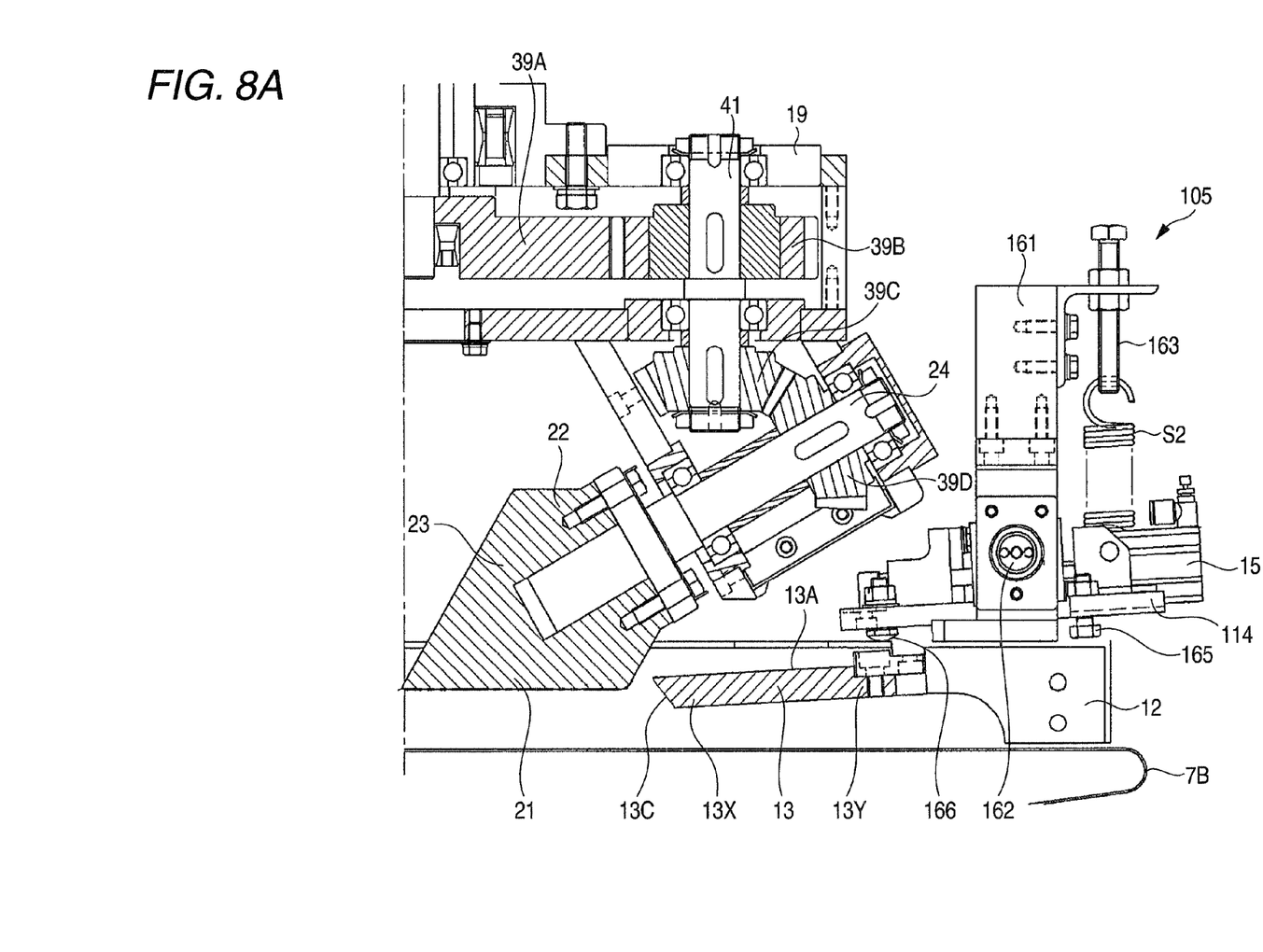
FIGS. 8A and 8B are explanatory front views which show conceptually and schematically the main part of the food dough rolling and forming apparatus according to the third embodiment of the invention.
Figure 8B:
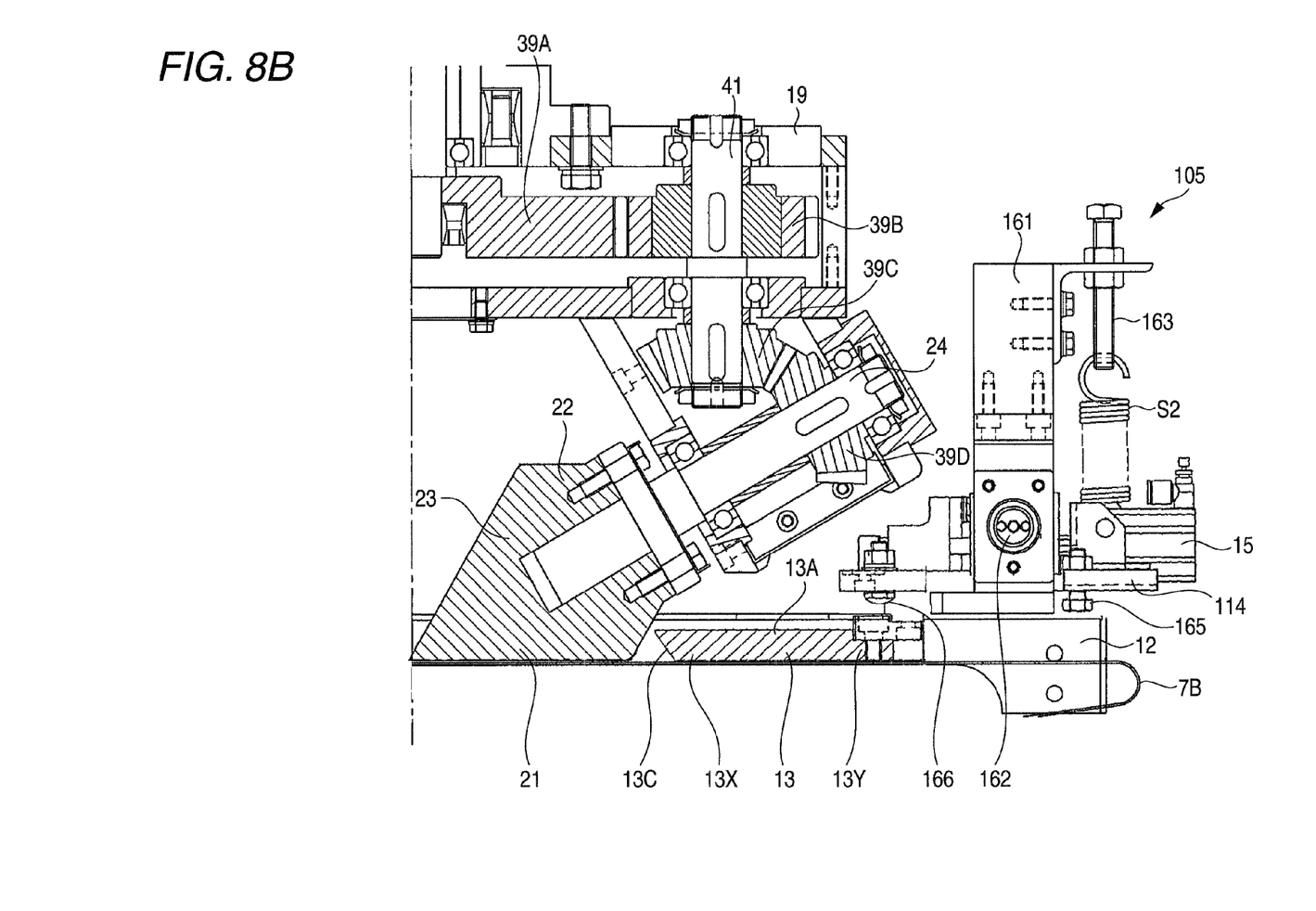

FIG. 7 is an explanatory plan view which shows conceptually and schematically the main part of the food dough rolling and forming apparatus according to a third embodiment of the invention. FIGS. 8A and 8B are explanatory front views which show conceptually and schematically the main part of the food dough rolling and forming apparatus according to the third embodiment of the invention, in which FIG. 8A shows the belt conveyer 7B located at a falling end position, and FIG. 8A shows the belt conveyer 7B located at the rising end position. The same elements as those of the first embodiment are designated by same reference symbols, and the repetition of the same description is omitted.

The food dough rolling and forming apparatus according to the third embodiment includes a frame unit 105, instead of the frame unit 5 of the first embodiment. Although FIGS. 7 and 8A-8B show only one frame member, the frame unit 105 includes, similar to the first embodiment, four frame members 13 for forming an external shape of food dough which are provided outside the revolving locus along which the rolling rollers 23 revolve around and at equal intervals in a circumferential direction in which the rolling rollers 23 revolve around the revolving axis C as a center of their revolution.

The frame unit 105 further includes swingable plates 114 correspond to the four frame members 13. Each of the swingable plates 114 is attached to a support member 161 via a swing shaft 162 rotatably connected to the support member 161. The support member 161 is provided on and extends upwards from the intermediate plate 12. Accordingly, the swingable plate 114 is swingable relative to the intermediate plate 12. The frame unit 105 further includes: a shaft 163 provided on an upper rear side of the support member 161; and a coil S2. An upper end of the coil S2 is attached to the lower end of the shaft 163, and a lower end of the coil S2 is attached to an upper portion of the swingable plate 114. Due to the restoration force of the spring S2, a biasing force is upwardly applied to a rear side portion of the swingable plate 114 at all times. Consequently, a front side portion (a side portion closer to the revolving axis C in the horizontal direction) of the swingable plate 114 is urged downwards. The hydraulic cylinder 15 is provided on an upper surface of each of the swingable plates 114, and four hydraulic cylinders 15 are provided radially at equal intervals around the revolving axis C. A guide member 93 is provided inside (a reciprocating rod 15A side) of each hydraulic cylinder 15, and the guide member 93 includes a reciprocating table 91 which is provided in such a manner as to freely reciprocate. The reciprocating rod 15A of the hydraulic cylinder 15 is connected to the reciprocating table 91. A rear side portion 13Y of the frame member 13 is connected the reciprocating table 91. Consequently, the frame members 13 are movable towards and away from each other in conjunction with the reciprocating motions of the respective reciprocating rods 15A. Accordingly, as shown in FIGS. 8A and 8B, the frame member 13, the hydraulic cylinder 15 and the swingable plate 114 are swingably around the swing shaft 162. Therefore, the frame member 13 is vertically movable in accordance with the vertical motion of the belt conveyer 7B. The lower surface of the swingable plate 114 has stoppers 165 and 166 provided thereon. One of the stoppers 165 and 166 may contact the intermediate plate 12, which can limit the vertical range of the swing motion of the swingable plate 114.

When the belt conveyer 7B rises to approach the rolling rollers 23 relatively, in the midst of the rising step of the belt conveyer 7B, a carrying surface (a food dough D resting surface) of the belt conveyer 7B is brought into abutment with the lower end portion 13E of the inner circumferential surface 13C of the frame member 13. When the belt conveyer 7B rises further, the swingable plate 114 swings such that the frame member 13 is raised relative to the rolling roller 23 (the frame member 13 becomes horizontal). As this occurs, the frame member 13 is brought into press contact with the carrying surface of the belt conveyer 7B by urging upwardly the rear side portion of the swingable plate 114 due to the restoration force of the spring S2 which is expanded further. Incidentally, as shown in FIG. 8B, the spring S2 (e.g., the constant of the spring S2) is set such that the frame member 13 takes a horizontal posture when the belt conveyer 7B is located at the rising end position thereof.

According to the frame unit 105 of this embodiment, the frame member 13 moves in the vertical direction (swings) based on a single swing shaft 162. Therefore, as compared with the first embodiment in which the frame member 13 moves in the vertical direction based on the four sliding shafts 16 and four compression springs S, it is possible to easily and precisely control the height of the lower end portion 13E of the inner circumferential surface 13C of the frame member 13 relative to the belt compare 7B. Consequently, the lower end portion 13E of the inner circumferential surface 13C of the frame member 13 can reliably abut the belt conveyer 7B with the rise of the belt conveyer 7B. In addition, the difference in the height among the lower end portions 13E of the four frame members 13 can be suppressed easily.

The food dough rolling forming apparatuses 1 according to the embodiments of the invention have been described heretofore. However, the invention is not limited thereto but can be modified variously without departing from the spirit and scope of the invention. In the foregoing description, while the rolling rollers 23 provided on the food dough rolling unit 3 are described as being made to revolve around while rotating on their axes, a configuration may be adopted in which the rolling rollers 23 are connected to the rotating motor in an interlocking fashion, while the food dough D resting table and the frame unit 5 are provided rotatably associated with the rotating direction of the rolling rollers 23, whereby the rolling rollers can be provided in such a manner as to relatively revolve around and rotate on their axes relative to the food dough.

In addition, while the rolling roller 23 is described has having the conical distal end portion 21 and the frustum-shaped rear end portion 22 inside and outside the largest diameter portion of the rolling roller, respectively, the rolling roller 23 may be made to have only a conical or frustum-shaped distal end portion. Even with this configuration, the function of the inner circumferential surface 13C of the frame member 13 or the forming surface in which the lower portion side is expanded further outwards than the upper portion side, the food dough which is pushed outwards from the largest diameter portion 21C of the rolling roller can be directed downwards, thereby making it possible to suppress the riding of the food dough on to the upper surface of the frame member. As described above, the distal end portion 21 has the substantially conical or frustum shape, which may be a shape having diameter progressively increasing with distant from the revolving axis from the end of the distal end portion 21 closer to the revolving axis. For example, the distal end portion 21 may extends in the rotation axial direction from a base end thereof to a distal end thereof, the distal end being closer to the revolving axis than the base end in a revolving radial direction with respect to the revolving axis, and the distal end having a diameter smaller than that of the base end. That is, the distal end portion 21 may have multiple an n-gonal pyramid shape or a frustum of n-gonal shape pyramid (n: integer). Further, the generatrix of the distal end portion 21 is not limited to a straight line and may have a curve or have a convex or concave shape. Further, the lateral surface of the substantially conical or frustum shape is not limited to a plain surface but may have a groove or a protrusion.

In addition, as is described in JP-B-3811790, a configuration may be adopted in which rolling rollers are mounted rotatably about a rotational axis of a rotational element and are formed into a frustum shape in which the diameter is increased outwards from the rotational center of the rotational element. Furthermore, a configuration may be adopted in which the frustum-shaped rolling rollers are made to be driven to rotate on their axes by a driving system which is different from the driving system for driving the rotational element to rotate on its axis. For example, a lower end face of a tubular rotational member which rotates in a circumferential direction about the rotational center (the revolving axis) of the rotational center as the rotational center is brought into abutment with a circumferential surface which corresponds to a generatrix of an uppermost portion of the rolling roller, so as to cause the rolling roller to rotate on its axis at faster speeds than a passive driven rotating speed of the rolling roller at which the rolling roller is passively driven to rotate on its axis.

Thus, by providing the revolving roller for driving the rolling rollers to revolve around and the rotating motor for driving the rolling rollers to rotate on their axes and controlling the rotating speed of the rolling rollers to become faster than the passive driven rotating speed thereof, the food dough whose external shape is formed by the frame unit can be rolled out effectively. Furthermore, it becomes possible to roll form food dough having a smooth surface which is free from wrinkles such as twisted patterns of food dough which would otherwise be formed thereon. The advantage of suppressing the formation of a wrinkle such as a twisted pattern of food dough on the upper surface (the rolled out surface) of the food dough is similarly provided even in a case where the inner circumferential surface of the frame member is formed into a vertical plane. The exemplified food dough rolling and forming apparatus 1 includes the revolving motor 17 and the rotating motor 25 as a revolving driving unit configured to drive the revolving motion of the rolling roller 23 and a rotating driving unit configured to drive the rotating motion of the rolling roller 23, respectively, but it is not limited thereto. For example, one of the revolving driving unit and the rotating driving unit may include a motor and the other thereof may include a gear connected to the motor. In this case, the revolving speed and the rotation speed can be controlled by the control unit 27 controlling the motor (i.e., one of the revolving driving unit and the rotating driving unit).

Further, the exemplified frame unit 5 includes the four frame members 13, but it is not limited thereto. For example, the frame unit may include a single frame member 13 including a frame hole 18 which can move vertically relative to the rolling roller 23.

According to the embodiments of the invention, it becomes possible not only to suppress the formation of thin pieces of food dough which protrudes from the circumferential edge portion of the food dough and the formation of wrinkles on the surface of the rolled out food dough but also to form the food dough into a desired shape.

What is claimed is:

1. An apparatus for rolling and forming a food dough comprising:
    a rolling roller configured to roll out a block of food dough placed on a table into a flattened shape; and
    a frame unit having an inner circumferential surface configured to face the rolling roller, wherein:
    the rolling roller is configured to revolve relative to the table around a revolving axis, and rotate relative to the table around a rotation axis of the rolling roller;
    the rolling roller is configured to move relatively towards and away from the table;
    the rolling roller comprises a first portion having a substantially conical or frustum shape extending in a rotation axial direction from a first base end thereof to a first distal end thereof, the first distal end being closer to the revolving axis than the first base end in a revolving radial direction with respect to the revolving axis, and the first distal end having a diameter smaller than that of the first base end;
    the frame unit is provided outside of a revolving locus of the first portion of the rolling roller; and
    the inner circumferential surface of the frame unit comprises an upper side portion and a lower side portion that is farther from the revolving axis than the upper side portion with respect to the revolving radial direction.

2. The apparatus according to claim 1, wherein the frame unit comprises a plurality of frame members, each of the frame members being movable relatively towards and away from the rolling roller in the revolving radial direction.

3. The apparatus according to claim 1, wherein the rolling roller is disposed such that a first generatrix of the first portion located at a lowest position thereof extends substantially parallel to the table.

4. The apparatus according to claim 1,
    wherein the rolling roller further comprises a second portion having a substantially frustum shape extending from a second base end connected to the first base end to a second distal end in the rotation axial direction opposite the first distal end, the second portion has a diameter decreasing towards the second distal end such that a second generatrix of the second portion located at a lowest position thereof is inclined upwards towards the second distal end.

5. The apparatus according to claim 4, wherein the inner circumferential surface of the frame unit is configured to face the second generatrix.

6. The apparatus according to claim 1, wherein an apex portion of the first portion of the rolling roller is located on the revolving axis such that the apex portion rolls out a part of the food dough situated at the revolving axis.

7. The apparatus of claim 6 including a plurality of rolling rollers wherein the apex portion of at least one of the plurality of rolling rollers is located on the revolving axis such that the apex portion rolls out a part of the food dough situated at the revolving axis.

8. The apparatus according to claim 1,
wherein the frame unit is configured to move vertically relative to the rolling roller so as to be brought into press contact with the table at least when the table relatively comes closest to the rolling roller.

9. The apparatus according to claim 1, further comprising a drive control unit configured to drive the rolling roller to maintain a rotating speed of the rolling roller higher than a passive driven rotating speed of the rolling roller which is a speed of the rolling roller passively rotated by a revolving motion of the rolling roller around the revolving axis.

10. The apparatus according to claim 9, wherein the drive control unit comprises:
 a revolving motor configured to drive the rolling roller to revolve relative to the table around the revolving axis;
 a rotating motor configured to drive the rolling roller to rotate around the rotation axis of the rolling roller; and
 a control unit configured to control the rotating motor so as to maintain an active driving rotating speed of the rolling roller that is higher than the passive driven rotating speed of the rolling roller.

11. An apparatus for rolling and forming a food dough comprising:
 a rolling roller configured to roll out a block of food dough placed on a table into a flattened shape, the rolling roller comprising a first portion having a substantially conical or frustum shape extending in an axial direction from a first base end thereof to a first distal end thereof that has a diameter smaller than that of the first base end, the rolling roller being configured to relatively move towards and away from the table;
 a revolving driving unit configured to drive the rolling roller to revolve relative to the table around a revolving axis;
 a rotating driving unit configured to drive the rolling roller to rotate around the axis of the first portion;
 a frame unit provided outside of a revolving locus of the first portion; and
 a control unit configured to control at least one of the revolving driving unit and the rotating driving unit to control a rotating speed of the rolling roller,
wherein the control unit is operable to:
maintain a ratio of an active driving rotating speed of the rolling roller driven by the rotating driving unit to a passive driven rotating speed of the rolling roller which is a speed of the rolling roller passively rotated by a revolving motion of the rolling roller such that the active driving rotating speed is faster than the passive driven rotating speed; and
increase the ratio of the active driving rotating speed to the passive driven rotating speed of the rolling roller while the rolling roller relatively moves towards the table.

\* \* \* \* \*